United States Patent Office 2,845,339
Patented July 29, 1958

2,845,339

METHOD OF DEFOLIATING PLANTS

Henry Bluestone, Cleveland Heights, Ohio, assignor to Diamond Alkali Company, Cleveland, Ohio, a corporation of Delaware No Drawing. Application March 29, 1954
Serial No. 419,586

5 Claims. (Cl. 71—2.5)

This invention relates to improvements in plant growth regulating materials, and more particularly relates to improved compositions and to methods for their use.

In recent years there has been considerable use of chemicals to defoliate various plants including, among others, cotton and soybean. Defoliation of plants offers certain advantages. For example, in defoliated cotton, the resultant increased exposure to sun and the drying action of air movement cause mature bolls to open faster. Moreover, defoliation prevents or reduces boll rot and, in addition, retards seed and fiber deterioration.

Cotton defoliation also has the advantage of preventing difficulties heretofore caused when the cotton leaves are crushed into the cotton, thereby leaving objectionable stains. Another difficulty heretofore encountered is the problem of removing dried leaves, which are carried along to the cotton gin with the bolls.

Although the defoliation of various plants is desirable when the crop is harvested by hand, since picking becomes easier and more comfortable, defoliation is particularly advantageous when mechanical pickers or harvesters are employed. Defoliated plants are free from leaves which would otherwise clog spindles of mechanical pickers or add to the trash which must be separated from the desired plant portion being harvested. In addition when leaves are removed, the operator of the mechanical picker has a better view of the plant to be harvested and is thus enabled to more easily position the picker over the plants.

Various chemical compounds have been heretofore suggested and used, in some instances on a rather large scale in the defoliation of cotton and other plants. Typical of prior defoliants are calcium cyanamid, monosodium cyanamid, potassium cyanate, sodium chlorate, sodium dichromate, pentachlorophenol, sodium pentaborate, sodium monochloroacetate, and magnesium chlorate hexahydrate. While, in many instances, these defoliants have been satisfactory in leaf removal, their use has not been a complete solution to the problem of defoliation. One of the difficulties encountered generally with prior defoliants has been a general plant tissue destruction and, in many instances, the phenomenon of leaf burning with resultant leaf and plant brittleness.

Accordingly, it is the principal object of the present invention to avoid the difficulties encountered with prior defoliant compositions and to provide new and improved defoliant materials and methods for their use.

Another object of the present invention is the provision of improved defoliant compositions which are highly specific in their action as defoliants.

A further object of this invention is the provision of highly effective defoliant compositions which may be applied in a systemic manner or directly to the plant foliage.

These and other objects and advantages of the invention will appear more fully from the description hereinafter.

As used herein, unless otherwise indicated, the term "plant" is intended to include all portions of the plant, such as the roots, stems, leaves, fruits, seeds, and blossoms.

The present invention contemplates a method of modifying the normal growth and life characteristics of a plant by contacting the plant with a composition comprising as an active ingredient a compound of the following formula

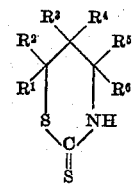

wherein $R^1$, $R^2$, $R^3$, $R^4$, $R^5$, and $R^6$ may be hydrogen or substituted and/or unsubstituted hydrocarbon radicals, including alkyl radicals, such as methyl, ethyl, propyl, butyl, and their isomers, as well as aryl, such as substituted or unsubstituted phenyl or naphthyl radicals, alkaryl, such as tolyl or xylyl radicals, and aralkyl radicals, such as benzyl, phenethyl radicals, as well as halogen substituted derivatives of the foregoing.

The compounds of this invention may also be descirbed as substituted or unsubstituted 2-mercapto-dihydro-1,3-thiazines, since the two tautomers

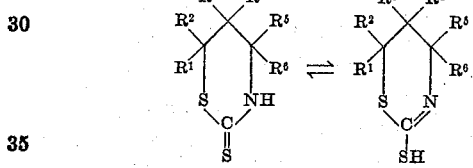

are equivalent for the purposes of this invention.

By the practice of the present invention, it has been discovered that improved defoliation is obtained when a plant is treated with a liquid composition of this invention by spraying, drenching, or immersing or with a powder composition embodying the present invention, or by applying such a composition to the soil, the defoliant action being obtained by absorption through the plant's roots and subsequent translocation through the plant circulatory system. Such latter "systemic" action is particularly advantageous in those instances where rainfall would tend to remove defoliants applied externally to the plant foliage. In any type of application, compositions embodying the present invention are singularly specific in their action as defoliants in causing abscission of the plant leaves from the stems.

In addition to the foregoing advantages as defoliants, compositions embodying this invention are also useful in the treatment of grain crops to harden them to maturity before frost when planted late in the season. For example, such compositions are useful in hardening to maturity an alfalfa crop planted after winter wheat of the preceding year. Another application of compositions of this invention is the treatment of nursery stock to force maturity and dormancy of the stock to provide a longer growing and harvesting season.

Specific illustrative examples of compounds embodying the present invention include:

2-thio-tetrahydro-1,3-thiazine,

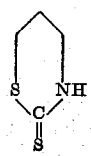

6-methyl-2-thio-tetrahydro-1,3-thiazine,

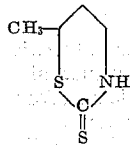

5-methyl-6-ethyl-2-thio-tetrahydro-1,3-thiazine,

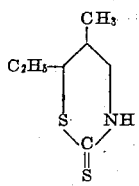

and 5-butyl-6-amyl-2-thio-tetrahydro-1,3-thiazine.

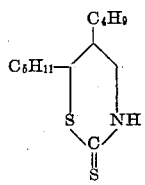

Synthesis of the compounds useful in the practice of the present invention can be accomplished by reacting a 1,3-amino alcohol with carbon disulfide to obtain a heterocyclic structure containing as substituents therein the groupings present in the amino alcohol.

It will be understood, of course, in any preparation of the active compounds employed in the practice of the practice of the present invention that a pure compound is not necessarily isolated at each step in the process and that purification of both intermediates and final products is generally practicable only to the extent necessary for removing by-products and impurities which otherwise would adversely affect the reaction yield or deleteriously affect the plants to which the materials are applied.

In order that those skilled in the art may better understand the practice of the present invention and in what manner it may be carried into effect, although the methods of synthesis described are not to be construed as the only suitable methods of preparation, the following examples illustrate the preparation of the compounds embodying the invention and their use as defoliants:

EXAMPLE I

*2 - thio - tetrahydro - 1,3 - thiazine.*—Into a 2 - liter, 3-necked, round-bottomed flasked equipped with a stirring motor, thermometer, and a dropping funnel are introduced 4 mols (160 grams) of sodium hydroxide, 450 ml. of distilled water, and 0.5 gram of a surface active agent, Ultra-Wet D. S. (alkyl benzene sodium sulfonate). The flask and its contents are then cooled to a temperature of 5° C., at which time 2 mols (152 grams) of 3-amino-propanol is added slowly with stirring. 2 mols (152 grams) of carbon disulfide is then added dropwise to the continuously stirred reaction mixture over a period of 105 minutes, while the temperature is kept between 5° and 10° C. After all of the carbon disulfide is added, stirring is continued for 2 hours, while the temperature is allowed to rise slowly to room temperature. The reaction mixture becomes blood red in color and is then refluxed for 8 hours at a temperature of about 45° C. and then heated for an additional 16 hours at a temperature of about 100° C. to distill off excess carbon disulfide. The reaction mixture is then cooled and allowed to stand, whereupon a solid separates. The mixture is then partially neutralized with 210 ml. of concentrated hydrochloric acid and the solid product is collected by filtration. The purified product, recrystallized from isopropyl alcohol, melts at 133° to 135° C.

The purified product of the foregoing reaction is applied as a spray (0.5% dispersion in water) to bean plants. The product exhibits excellent defoliating properties, as evidenced by the fact that all plant leaves are removed in four days, both the leaves and the plant being unembrittled by the defoliating material. Excellent defoliation is also observed when the product of the above reaction is applied as a soil additive to bean plants at a dosage of 150 mg. per plant in a 4-inch diameter pot.

EXAMPLE II

Part A

*6-methyl-2-thio-tetrahydro-1,3-thiazine.*—4 mols (160 grams) of sodium hydroxide is dissolved in 450 ml. of distilled water, to which is added 1 gram of a wetting agent (Ultra-Wet D. S.). The resultant mixture is placed in a 3-necked, round-bottomed flask equipped with a thermometer, dropping funnel, and stirrer. The flask and its contents are then placed in an ice bath to reduce the temperature of the mixture of 5° C., and 1 mol (89 grams) of 4-amino-2-butanol and 2 mols (152 grams) of carbon disulfide are added, the carbon disulfide being added dropwise over a period of 130 minutes, while the reaction temperature is maintained between 5° and 10° C.

During the reaction, the color changes from colorless through orange to red. The reaction mixture is heated for 8 hours at about 45° C. and for 4 hours at about 80° to 90° C. and allowed to cool to room temperature. The solid which separates is removed by filtration and weights 73 grams. This is a crude product yield of 53% of theoretical. An excess of isopropyl alcohol is added to the solid and the mixture is boiled for 15 minutes to extract the product from the $Na_2CO_3$ formed. The isopropyl alcohol is then filtered and partially evaporated. The product which separates from this partially evaporated isopropyl alcohol is recrystallized three times from isopropyl alcohol to obtain a product having a melting point of 124° to 125.5° C.

Part B

The product obtained according to Part A is applied to bean plants at a dosage of 150 mg. per plant in a 4-inch diameter pot. Complete defoliation is observed after four days.

Part C

The product obtained by the process of Part A is dispersed in water to form a 0.5% by weight dispersion, to which is then added the non-ionic wetting agent Igepal CO-880 at 0.1% strength. The resultant material, in amounts of 100 ml. each, is sprayed on bean plants having well developed trifoliate leaves, care being taken so that none of the spray enters the soil or roots of the plant. The plants, so treated, were completely defoliated in four days. Similar tests conducted using other wetting agents, including Arquad 2-C, Emulphor DN-870, Tween 80, and Triton X-155 produced substantially identical results.

It will be understood, of course, that compounds embodying the present invention may be employed either alone or in mixtures containing one or more of the compounds as active ingredients, with or without small amounts of wetting agents added.

Typical of suitable wetting agents are the following commercially available trade-name products: Igepal CO-880 (alkyl phenoxypolyoxyethylene ethanol), Arquad 2-C (quaternary ammonium compound of the formula RR'—N—$(CH_3)_2Cl$), Emulphor ON-870 (polyoxyethylated fatty alcohol), Tween 80 (polyoxyethylene sorbitan monooleate), Triton X-155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F-68 (condensate of ethylene oxide with an hydrophobic base formed by condensing propylene oxide with propylene glycol), Antarox A-400 (alkyl phenoxypolyoxyethylene ethanol), Triton X-120 (alkyl aryl polyether alcohol), Nacconol NRSF (alkyl aryl sulfonate), Aresol OS (isopropyl naphthylene sodium sulfonate), Span 40 (sorbitan monopalmitate), Triton B-1956 (modified phthalic glycerol alkyl resin), and Antarox B-290 (polyoxyethylated vegetable oil). At present, a preferred wetting agent is the non-ionic material Igepal CO-880 employed in an amount of about 0.1% by weight based on the amount of liquid present.

It will be understood, of course, that compounds embodying the present invention are effective when applied to plants systemically, via root absorption, or in a direct manner, as by spraying, sprinkling, or drenching the plant with a solution of the compound, or by dusting with a dry material containing a compound of the present invention as an active ingredient, or by application as a slurry containing a compound of the present invention as an active ingredient.

Although compounds embodying the present invention may be employed as wettable powders, with or without diluents and/or extenders or other modifying ingredients, including such things as insecticides or other plant treating agents, a typical application utilizes compounds of the present invention in the form of a liquid spray in a concentration of about 0.5% by weight. In such a spray material water is, of course, a satisfactory liquid, although other liquids also may be employed.

While there have been described various embodiments of the invention, the methods described are not intended to be understood as limiting the scope of the invention, as it is realized that changes therewithin are possible, it being intended to cover the invention broadly in whatever form its principle may be utilized.

What is claimed is:

1. A method of defoliating plants which comprises applying to the plants in an amount sufficient to effect defoliation a compound having the formula

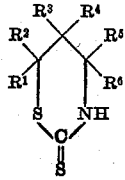

wherein $R^1$, $R^2$, $R^3$, $R^4$, $R^5$, and $R^6$ are selected from the group consisting of hydrogen, alkyl, aryl, alkaryl, and aralkyl radicals.

2. A method of defoliating plants which comprises applying as a systemic defoliant in an amount sufficient to effect defoliation a material including as an active ingredient a compound having the formula

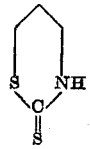

3. A method of defoliating plants which comprises applying as a systemic defoliant a material including as an active ingredient in an amount sufficient to effect defoliation a compound having the formula

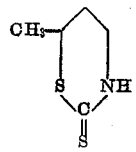

4. The method of claim 1 in which there is also employed with said compound a small amount of a wetting agent.

5. The method of defoliating growing plants which consists in contacting said plants with a defoliating amount of a substance selected from the group consisting of 2-thio-tetrahydro-1,3-thiazine and alkyl-substituted 2-thio-tetrahydro-1,3-thiazines, a wetting agent, and a carrier.

References Cited in the file of this patent

UNITED STATES PATENTS

| 2,086,186 | Messer | July 6, 1937 |
| 2,170,059 | Mathes | Aug. 22, 1939 |
| 2,348,917 | Mathes | May 16, 1944 |
| 2,547,682 | Baumgartner | Apr. 3, 1951 |
| 2,568,633 | Jansen | Sept. 18, 1951 |
| 2,651,630 | Downey | Sept. 8, 1953 |

FOREIGN PATENTS

| 626,486 | Great Britain | July 15, 1949 |

UNITED STATES PATENT OFFICE
CERTIFICATE OF CORRECTION

July 29, 1958

Patent No. 2,845,339

Henry Bluestone

It is hereby certified that error appears in the printed specification of the above numbered patent requiring correction and that the said Letters Patent should read as corrected below.

Column 2, line 26, for "descirbed" read --described--; column 3, line 33, after "practice" strike out "of the"; line 34, strike out "practice"; line 51, for "flasked" read --flask--; column 4, line 20, for "mixture of" read --mixture to--; line 31, for "weights" read --weighs--; column 5, line 7, for "alkyl" read --alkyd--.

Signed and sealed this 7th day of October 1958.

(SEAL)
Attest:
KARL H. AXLINE

Attesting Officer

ROBERT C. WATSON
Commissioner of Patents